(12) United States Patent
Ezaki et al.

(10) Patent No.: US 7,174,887 B2
(45) Date of Patent: Feb. 13, 2007

(54) VARIABLE VALVE SYSTEM

(75) Inventors: Shuichi Ezaki, Susono (JP); Toshiaki Asada, Mishima (JP); Manabu Tateno, Nagaizumi-cho (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 85 days.

(21) Appl. No.: 11/060,681

(22) Filed: Feb. 18, 2005

(65) Prior Publication Data

US 2005/0193969 A1    Sep. 8, 2005

(30) Foreign Application Priority Data

Mar. 4, 2004    (JP)    ............................. 2004-060914

(51) Int. Cl.
*F01L 1/34*    (2006.01)
(52) U.S. Cl. .............................. 126/90.16; 123/90.17; 123/90.15; 123/90.11; 251/284; 251/288; 701/105
(58) Field of Classification Search ............. 123/90.16; 701/105
See application file for complete search history.

(56) References Cited

U.S. PATENT DOCUMENTS 6,260,523 B1 *    7/2001    Nakamura et al. ........ 123/90.15
6,578,534 B2 *    6/2003    Nohara et al. ........... 123/90.16
6,920,852 B2 *    7/2005    Machida ................... 123/90.16
2005/0193968 A1 *    9/2005    Nohara et al. ........... 123/90.16

FOREIGN PATENT DOCUMENTS

JP    A 2000-234507    8/2000
JP    A 2002-349215    12/2002

* cited by examiner

*Primary Examiner*—Thomas Denion
*Assistant Examiner*—Kyle M. Riddle
(74) *Attorney, Agent, or Firm*—Oliff & Berridge, PLC

(57) ABSTRACT

A variable valve mechanism is installed to change the operating angle and lift amount of an intake valve in accordance with the rotation position of a control shaft. A worm wheel is secured to the control shaft. The worm wheel is coupled to a motor actuator via a worm gear. The motor actuator is controlled during a normal operation so that the rotation position of the control shaft changes within a normal rotation range. A low-end stopper and high-end stopper are installed outside the normal rotation range to mechanically restrict the rotation of the control shaft.

6 Claims, 4 Drawing Sheets

VARIABLE VALVE SYSTEM

BACKGROUND OF THE INVENTION

1. Field of the Invention

The present invention relates to a variable valve system, and more particularly to a variable valve system for changing the operating angle and/or lift amount of an internal combustion engine's valve body.

2. Background Art

A conventionally known variable valve system, which is disclosed, for instance, by Japanese Patent Laid-Open No. 2002-349215, is capable of changing the lift amount of an internal combustion engine's valve body by changing the rotation position of a control shaft. This conventional system comprises a rotation angle sensor, which varies its output in accordance with the rotation position of the control shaft, and a rotary drive mechanism, which provides feedback control over the rotation position of the control shaft in accordance with the sensor output.

More specifically, the above conventional variable valve system performs a process for detecting the current rotation position in accordance with the difference between the reference output and actual output of the rotation angle sensor, and also performs a process for controlling the rotary drive mechanism to ensure that the detected current rotation position coincides with a target position. When these processes are performed, the control shaft rotation position agrees with the target position, thereby providing a target lift amount.

To obtain the target lift amount accurately by performing the above processes, it is necessary to ensure that the rotation angle sensor output accurately agrees with the actual rotation position. In general, however, the relationship between the sensor output and rotation position cannot be predefined due to varying rotation angle sensor mounting positions and various changes with time.

Under the above circumstances, the above conventional variable valve system includes a stopper for inhibiting the control shaft from making an unnecessary revolution. More specifically, the conventional variable valve system includes a stopper for restricting the rotation of the control shaft at a rotation position at which a minimum lift is generated. While the stopper provides restriction, the conventional variable valve system recognizes the rotation angle sensor output as the reference output. In this instance, it is assured that the reference output corresponds to the rotating end of a small lift side of the control shaft.

Being based on the reference output that assuredly corresponds to the rotating end of the control shaft as described above, the above conventional variable valve system acquires the actual output of the rotation angle sensor. Therefore, the mechanism employed by the above conventional variable valve system accurately detects the rotation position of the control shaft without being affected, for instance, by varying rotation angle sensor mounting positions.

Including the above-mentioned document, the applicant is aware of the following documents as a related art of the present invention.

[Patent Document 1]
Japanese Patent Laid-Open No. 2002-349215
[Patent Document 2]
Japanese Patent Laid-Open No. 2000-234507

However, the stopper of the above conventional variable valve system is positioned at an end point of a control shaft's normal rotation range. When this configuration is employed, it is likely that the control shaft will frequently have a mechanical collision with the stopper under normal operating conditions. Even if the rotary drive mechanism is controlled so that the control shaft stops rotating at the above-mentioned end point, the control shaft does not accurately stop rotating at the end point due, for instance, to the inertia of a rotation system and an error in rotation position detection. Therefore, when the above-mentioned conventional configuration is employed, the minimum lift is demanded so that the control shaft is likely to frequently collide against the stopper.

If the control shaft frequently collides against the stopper, the stopper and the member colliding against the stopper are likely to wear and deform. When such a collision occurs, the rotary drive mechanism is significantly impacted so that the components of the rotary drive mechanism may also wear and deform. Thus, it is likely that various components of the above conventional variable valve system will prematurely deteriorate.

SUMMARY OF THE INVENTION

The present invention has been made to solve the above problems. It is an object of the present invention to provide a variable valve system that does not allow the control shaft to collide against the stopper as far as the control shaft rotates within a normal rotation range.

The above object is achieved by a variable valve system which includes a variable valve mechanism for changing the operating angle and/or lift amount of a valve body in accordance with the rotation position of a control shaft. A rotary drive mechanism for rotating the control shaft is provided. A drive mechanism control unit for controlling the rotary drive mechanism is also provided so that the rotation position of the control shaft changes within a normal rotation range during a normal operation. A stopper is further provided for mechanically restricting the rotation of the control shaft outside the normal rotation range.

Other objects and further features of the present invention will be apparent from the following detailed description when read in conjunction with the accompanying drawings.

BRIEF DESCRIPTION OF DRAWINGS

FIG. 1 is viewed from II;

BEST MODE FOR CARRYING OUT THE INVENTION

FIRST EMBODIMENT

[Basic Configuration and Basic Operation of First Embodiment]

Figure 1:
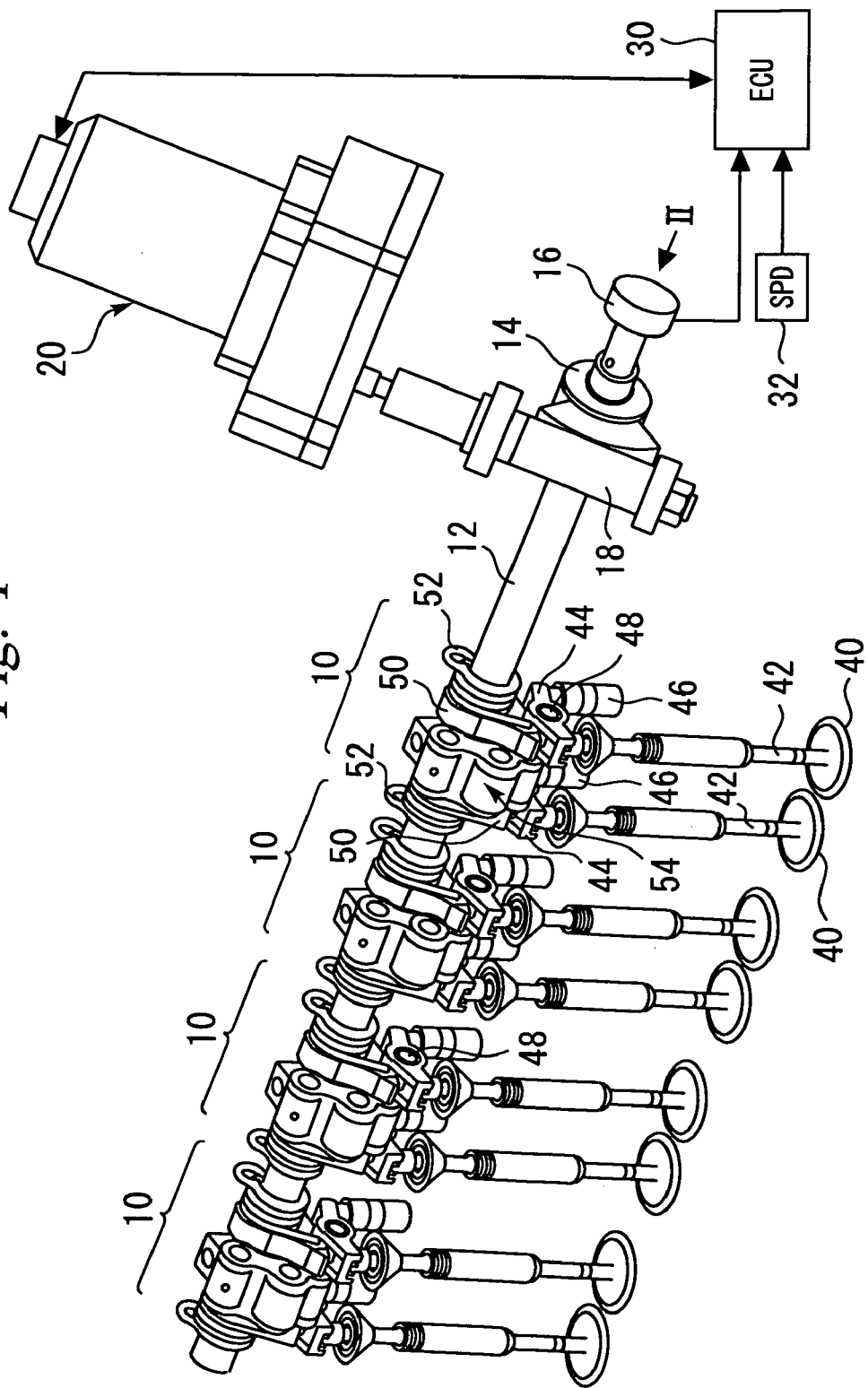
FIG. 1 is a perspective view illustrating the overall configuration of a variable valve system according to a first embodiment of the present invention.

FIG. 1 is a perspective view illustrating the overall configuration of a variable valve system according to a first embodiment of the present invention. The system according to the present embodiment is to be used in conjunction with a linear four-cylinder internal combustion engine and has four variable valve mechanisms 10, which are provided for individual cylinders. The system according to the present embodiment also includes a control shaft 12. The control shaft 12 is positioned so as to penetrate all the variable valve mechanisms 10 and run longitudinally relative to the four cylinders. A bearing (not shown) secures the control shaft 12 to a cylinder head of the internal combustion engine.

The control shaft 12 is provided with a worm wheel 14. The worm wheel 14 is positioned near the end of the control shaft 12. The end of the control shaft 12 is also provided with a rotation angle sensor 16, which generates an output that corresponds to the rotation position of the control shaft 12. The worm wheel 14 meshes with a worm gear 18 whose longitudinal direction is perpendicular to the axial direction of the control shaft 12. The worm gear 18 is a helically cut gear. Meanwhile, the worm wheel 14 is slantingly toothed so as to mesh with the helically cut gear. The combination of the worm gear 18 and worm wheel 14 converts the rotation of the worm gear 18 to the rotation of the control shaft 12 at a great reduction ratio.

The worm gear 18 is coupled to a motor actuator 20. Upon receipt of a drive signal from the outside, the motor actuator 20 rotates its rotation shaft at an arbitrary speed. Therefore, the system according to the present embodiment can rotate the control shaft 12 at a desired speed by controlling the rotation of the motor actuator 20.

The system according to the present embodiment includes an ECU 30. The output from the above-mentioned rotation angle sensor 16 and the output from a vehicle speed sensor 32 are supplied to the ECU 30. The ECU 30 detects the rotation position of the control shaft 12 in accordance with the output from the rotation angle sensor 16. Further, the ECU 30 detects the vehicle speed SPD and distance traveled in accordance with the output from the vehicle speed sensor 32. The motor actuator 20 is connected to the ECU 30. The ECU 30 outputs an appropriate drive voltage to drive the motor actuator 20, and detects a motor current $I_M$ to determine the load applied to the motor actuator 20.

In the present embodiment, each cylinder of the internal combustion engine is provided with two intake valves 40. Each intake valve 40 has a valve stem 42. A valve spring (not shown) works so that the upper end of the valve stem 42 is brought into contact with one end of a rocker arm 44. The other end of the rocker arm 44 is supported by a hydraulic lash adjuster 46 so that the rocker arm 44 can turn on such a support point. The center of the rocker arm 44 is provided with a roller 48.

Being provided with two intake valves 40, each cylinder has two rocker arms 44 and two rollers 48, which are built in the rocker arms 44. Each variable valve mechanism 10 includes the two rollers 48 and two oscillation arms 50. The oscillation arms 50 are installed over the control shaft 12 in such a manner that they freely turn. When the oscillation arms 50 turn in one direction, they lower the rollers 48 of the rocker arms 44 to open the intake valves 40. The above-mentioned "one direction" is hereinafter referred to as the "valve opening direction", whereas the opposite direction is hereinafter referred to as the "valve closing direction".

A lost motion spring 52 is mounted on the side of an oscillation arm 50. An intermediate arm 54 is positioned between the two oscillation arms 50. One end of the intermediate arm 54 is connected to an arm which is fixed to the control shaft 12 in such a manner that the intermediate arm 54 freely turns. Further, the center of the intermediate arm 54 is in mechanical contact with a cam (not shown). When the cam applies pushing pressure to the intermediate arm 54, the intermediate arm 54 turns on the above-mentioned end and transmits the pushing pressure to the oscillation arms 50 via the other end.

The pushing pressure transmitted as described above works as a torque that turns the oscillation arms 50 in the valve opening direction. Meanwhile, the lost motion springs 52 work on the oscillation arms 50. The force of the lost motion springs 52 works as a torque for turning the oscillation arms 50 in the valve closing direction. In other words, the force of the lost motion springs 52 works to ensure that the oscillation arms 50, the intermediate arm 54, and the cam (not shown) are in mechanical contact with one another at all times.

When the cam rotates in accordance with the operation of the internal combustion engine while the variable valve mechanism 10 is configured as described above, the intermediate arm 54 and oscillation arms 50 oscillate in synchronism with the rotation of the cam. When the oscillation arms 50 oscillate, the rocker arms 44 oscillate so that the intake valves 40 open/close. Therefore, while the internal combustion engine operates, the variable valve mechanism 10 opens and closes the intake valves 40 in synchronism with cam rotation.

Figure 2:
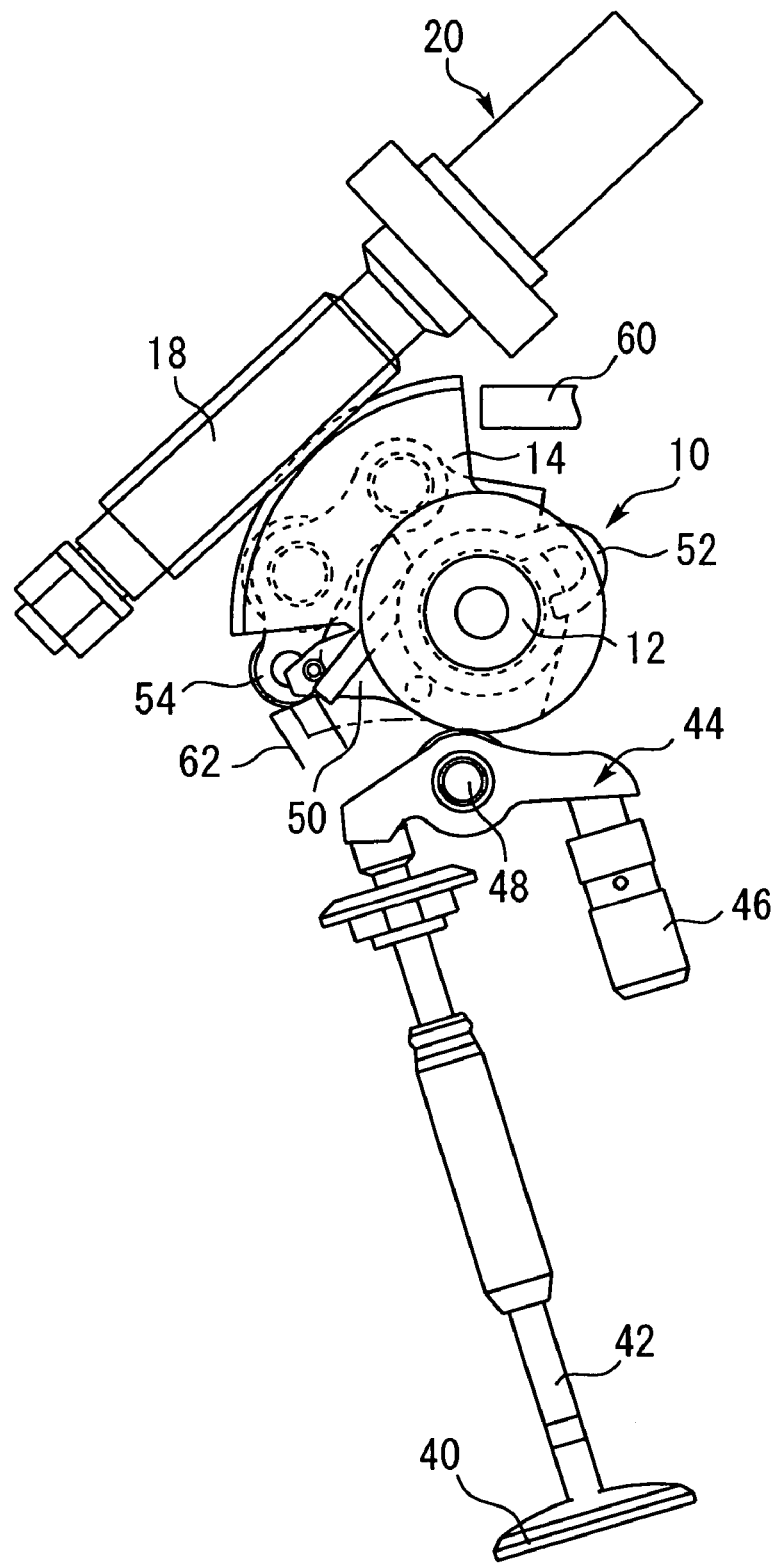
FIG. 2 is a side view of the variable valve system according to the first embodiment of the present invention, which is obtained when

FIG. 2 is a side view illustrating the variable valve system according to the present embodiment. This side view is obtained when FIG. 1 is viewed from II. As described earlier, the variable valve system according to the present embodiment causes the motor actuator 20 (see FIG. 1) to rotate the worm gear 18. Then, the worm wheel 14 is rotated to rotate the control shaft 12. One end of the intermediate arm 54 is coupled to the arm which is fixed to the control shaft 12. Therefore, when the rotation position of the control shaft 12 changes, the intermediate arm 54 changes its attitude while remaining in contact with the cam (not shown).

The oscillation arm 50 is always pushed toward the intermediate arm 54 by the lost motion spring 52. Therefore, when the status of the intermediate arm 54 changes, the oscillation arm 50 changes its rotation position in accordance with such a change in the status of the intermediate arm 54. More specifically, the oscillation arm 50 within the variable valve mechanism 10 rotates in the valve closing direction when the control shaft 12 rotates clockwise in FIG. 2. When the control shaft 12 rotates in the opposite direction, the oscillation arm 50 rotates in the valve opening direction. Therefore, when the control shaft 12 rotates in the former direction (clockwise), the variable valve mechanism 10 shifts the oscillation range of the oscillation arm 50 in the valve closing direction. When the control shaft 12 rotates in the opposite direction (counterclockwise), the variable valve mechanism 10 shifts the oscillation range of the oscillation arm 50 in the valve opening direction.

The time interval (rotation angle) between the instant at which the oscillation arm 50 begins to oscillate in the valve opening direction and the instant at which the rocker arm 44 actually begins to be pushed in the valve opening direction increases as the extent of oscillation of the oscillation arm 50 shifts toward the valve closing direction. Therefore, the valve opening period (operating angle) and lift amount of the intake valve 40 decrease as the extent of oscillation of the oscillation arm 50 shifts toward the valve closing direction, and increase as the extent of oscillation shifts toward the valve opening direction.

In other words, when the control shaft 12 rotates clockwise in FIG. 2, the variable valve mechanism 10 decreases the operating angle and lift amount of the intake valve 40. When the control shaft 12 rotates in the opposite direction, the variable valve mechanism 10 increases the operating angle and lift amount of the intake valve 40. The control shaft rotation direction for decreasing the lift amount is hereinafter referred to as the "small lift direction", whereas the control shaft rotation direction for increasing the lift amount is hereinafter referred to as the "great lift direction".

[Features of First Embodiment]

For the variable valve mechanism 10, the maximum lift amount and minimum lift amount to be provided during a normal operation of the internal combustion engine are predefined. The control shaft rotation position for providing the maximum lift amount (and maximum operating angle) is referred to as the "maximum lift position". The control shaft rotation position for providing the minimum lift amount (and minimum lift amount) is referred to as the "minimum lift position". FIG. 2 indicates that control is exercised to set the rotation position of the control shaft 12 to the minimum lift position.

Figure 3:
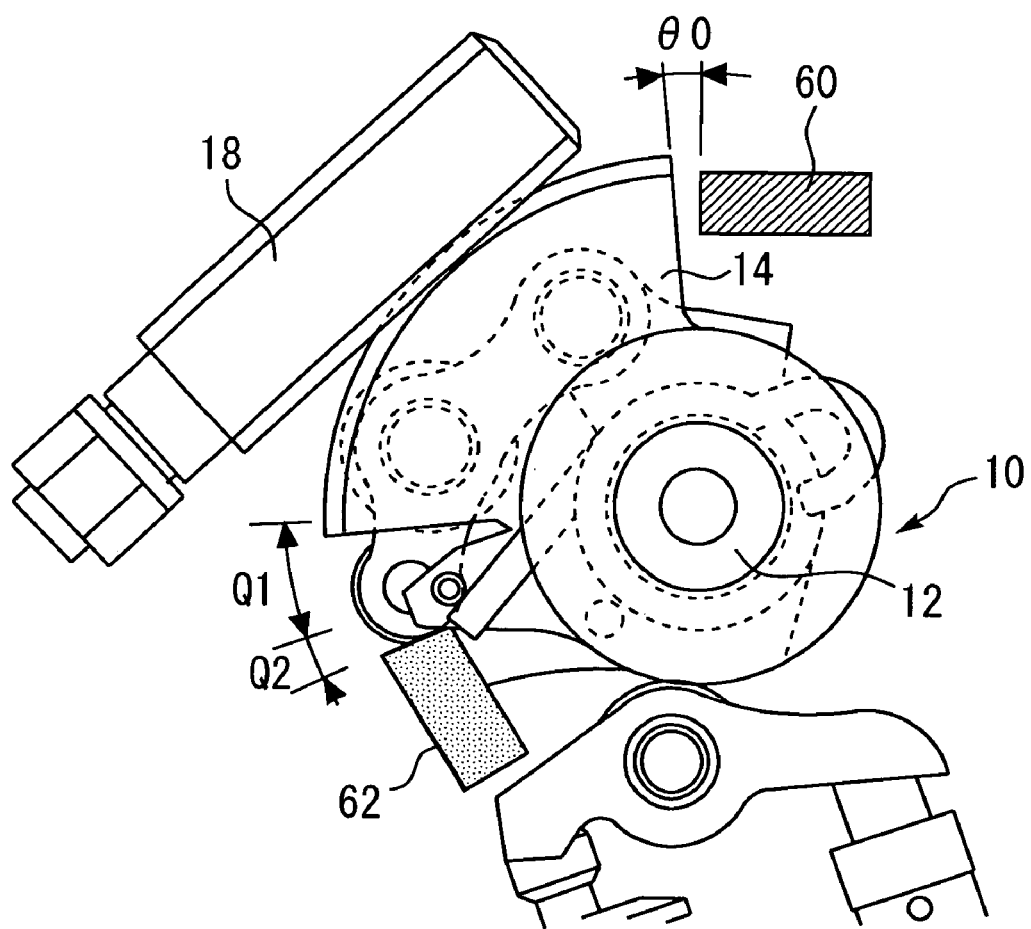
FIG. 3 is an enlarged view of a worm wheel and the parts around the worm wheel, which are shown in FIG. 2.

FIG. 3 is an enlarged view of the worm wheel 14 and the parts around the worm wheel 14, which are shown in FIG. 2. FIG. 3 also indicates that the rotation position of the control shaft 12, that is, the rotation position of the worm wheel 14, is set to the minimum lift position. As indicated in FIG. 3, the variable valve mechanism 10 includes a low-end stopper 60, which comes into contact with a sidewall of the worm wheel 14 when the control shaft 12 rotates beyond the minimum lift position and then through a predetermined angle $\theta_0$ in the small lift direction. Outside the normal rotation region, the low-end stopper 60 inhibits the worm wheel 14 from excessively moving in the small lift direction.

The control shaft 12 reaches the maximum lift position when it rotates through a predetermined angle $\theta_1$ in the great lift direction from a position indicated in FIG. 3. The variable valve mechanism 10 includes a high-end stopper 62, which comes into contact with the worm wheel 14 when the control shaft 12 rotates beyond the maximum lift position and then through a predetermined angle $\theta_2$. Outside the normal rotation region, the high-end stopper 62 inhibits the worm wheel 14 from excessively moving in the great lift direction.

As described above, the system according to the present embodiment includes the low-end stopper 60 and high-end stopper 62. The low-end stopper 60 is placed at a position that is shifted toward a smaller lift side from the minimum lift position. The high-end stopper 62 is placed at a position that is shifted toward a greater lift side from the maximum lift position. When this configuration is employed, the worm wheel 16 does not collide against the low-end stopper 60 or high-end stopper 62 as far as the rotation position of the control shaft 12 is controlled and maintained within the normal rotation region.

If, on the other hand, the low-end stopper 60 and high-end stopper 62 are respectively placed at the minimum lift position and maximum lift position, the worm wheel 16 frequently collides against the low-end stopper 60 and high-end stopper 62 in a normal operating environment. In such an instance, the lateral surfaces of the stoppers 60, 62 and worm wheel 14 are likely to wear. Further, the section of engagement between the worm wheel 14 and worm gear 18 is likely to become gouged and then rapidly wear. The system according to the present embodiment can sufficiently reduce the possibility of such wear, and is therefore capable of providing excellent durability.

[Learning Process of First Embodiment]

In the present embodiment, the ECU 40 detects the position of the control shaft 12 in accordance with the output from the rotation angle sensor 16 (see FIG. 1). The ECU 40 properly drives the motor actuator 20 so that the detected rotation position coincides with a target position. The rotation angle sensor 16 has a function of changing its output in accordance with the rotation position of the control shaft 12, and does not output an absolute value corresponding to the rotation position. To accurately detect the rotation position of the control shaft 12 in accordance with the output from the rotation angle sensor 16, it is necessary to predetermine what reference output the rotation angle sensor 16 generates at a reference rotation angle.

In the system according to the present embodiment, the positions of the low-end stopper 60 and high-end stopper 62 can be mechanically determined with high accuracy. In addition, the positional relationship between the worm wheel 14 and control shaft 12 can be mechanically determined with high accuracy. Therefore, when the worm wheel 14 comes into contact with the low-end stopper 60 or high-end stopper 62, the rotation position of the control shaft 12 can be accurately set to a predetermined position. From such a view point, the system according to the present embodiment brings the worm wheel 14 into contact with the low-end stopper 60 at predetermined time intervals and learns (calibrates) the reference output of the rotation angle sensor 16 in accordance with the output generated by the rotation angle sensor 16.

Figure 4:
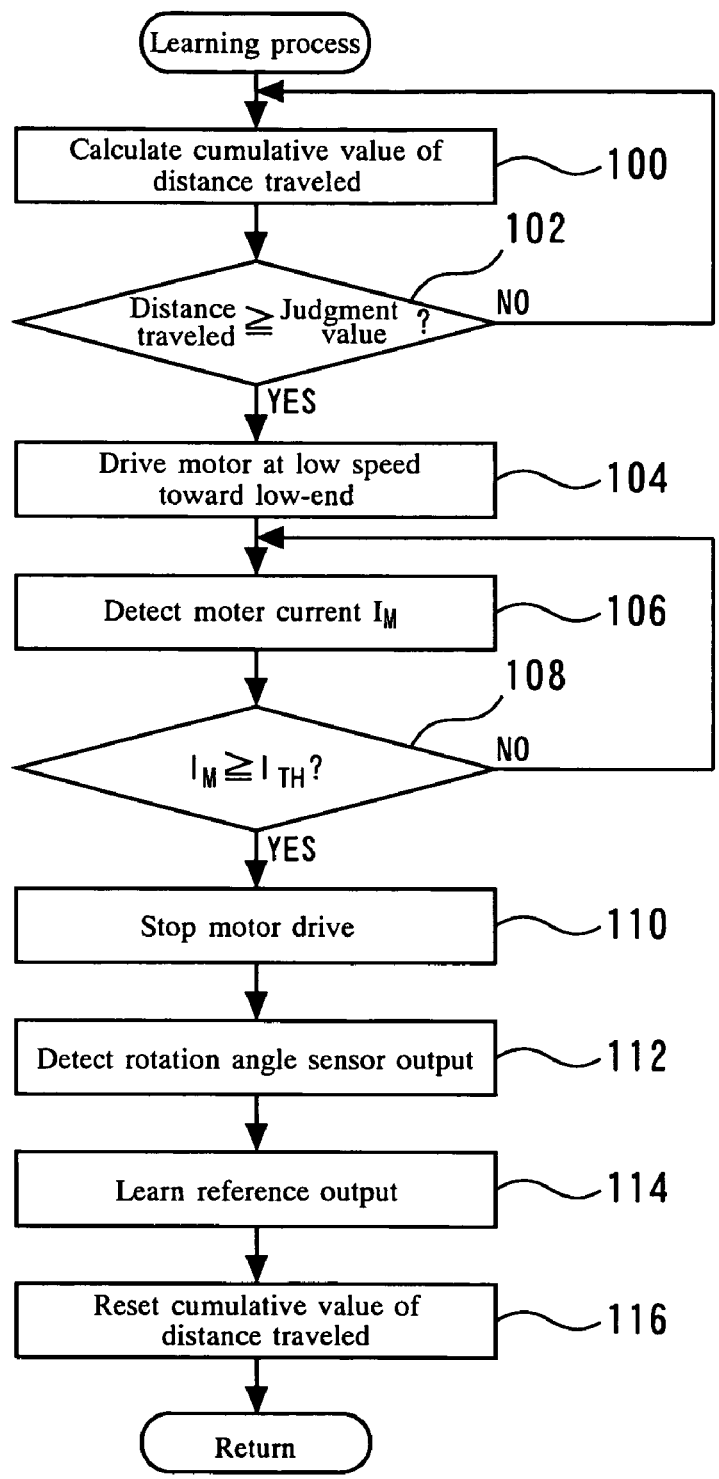
FIG. 4 is a flowchart illustrating a routine that is executed in the first embodiment of the present invention.

FIG. 4 is a flowchart illustrating a routine that the ECU 40 executes in order to implement the above functionality. In the routine shown in FIG. 4, the cumulative value of the distance traveled is first calculated in accordance with the output from the vehicle speed sensor 32 (step 100). The calculated cumulative value is reset each time the reference output of the rotation angle sensor is updated as described later. In step 100, therefore, the cumulative value of the distance traveled is calculated after the last reference output update.

Step 102 is then performed to judge whether a judgment value is reached by the above-mentioned cumulative value of distance traveled. If the obtained judgment result indicates that the judgment value is not reached, step 100 is performed again. If, on the other hand, the obtained judgment result indicates that the judgment value is reached by the cumulative value of distance traveled, the motor actuator 20 is driven at a low speed so that the worm wheel 14 turns toward the low-end stopper 60 (step 104).

Step 106 is then performed to detect a motor current $I_M$ that flows to the motor actuator 20. Next, step 108 is performed to judge whether a contact judgment value $I_{TH}$ is reached by the motor current $I_M$. After completion of step 104, a predetermined voltage is applied to the motor actuator 20 to provide low-speed drive. In this situation, the motor current $I_M$ increases with an increase in the load imposed on the motor actuator 20. Therefore, when the worm wheel 14 comes into contact with the low-end stopper 60, the motor current $I_M$ suddenly increases.

The contact judgment value $I_{TH}$ for use in step 108 is slightly greater than the maximum motor current value that can be generated while the worm wheel 14 is not in contact with the low-end stopper 60. Therefore, when the worm wheel 14 comes into contact with the low-end stopper 60 so that the motor current $I_M$ rises above a normal level, the process performed in step 108 immediately detects a change in the motor current $I_M$ and promptly detects that the worm wheel 14 is in contact with the low-end stopper 60.

If query step 108 is answered "No", it can be concluded that the worm wheel 14 is not in contact with the low-end stopper 60. In this instance, step 106 is performed again. If, on the other hand, query step 108 is answered "Yes", it can be concluded that the worm wheel 14 is brought into contact with the low-end stopper 60. In this instance, the drive for the motor actuator 20 comes to a stop (the position of the control shaft 12 is fixed) (step 110). Step 112 is then performed to detect the output from the rotation angle sensor 16 while the drive for the motor actuator 20 is stopped with the position of the control shaft 12 fixed.

When the above process is performed, the output from the rotation angle sensor 16 can be detected while assuring that the control shaft 12 is rotated in the small lift direction by $\theta_0$ from the minimum lift position. In the routine shown in FIG. 4, the reference output of the rotation angle sensor 16 is learned in accordance with a sensor output that is detected in the above process (step 114). When, for instance, the output prevailing when the low end is contacted is to be defined as the reference output, the output detected in step 112 is directly learned as the reference output. When the output corresponding to the minimum lift position is to be defined as the reference output, the output detected in step 112 is changed by an angle of $\theta_0$ for correction purposes. The resulting corrected output is then used as the reference output. When the above process is completed, the currently obtained cumulative value of distance traveled is reset finally (step 116).

Each time a predetermined judgment value is reached by the cumulative value of distance traveled, the process described above makes it possible to mechanically fix the position of the control shaft 12 and learn the reference output of the rotation angle sensor 16. Therefore, the system according to the present embodiment can periodically absorb, for instance, the variations in the mounting position of the rotation angle sensor 16 and the influence of various changes with time. As a result, the true rotation position of the control shaft 12 can be accurately detected in accordance with the output from the rotation angle sensor 16.

The process described above also ensures that the reference output of the rotation angle sensor 16 can be learned while the worm wheel 14 is in contact with the low-end stopper 60. In other words, the system according to the present embodiment makes it possible to learn the reference output of the rotation angle sensor 16 while the control shaft 12 is fixed at the rotating end in the small lift direction. The difference between the output from the rotation angle sensor 12 and the actual rotation position of the control shaft 12 is likely to increase with an increase in the distance between the rotation position and a position at which the reference output is obtained. Therefore, the learning method according to the present embodiment makes it possible to detect the rotation position of the control shaft 12 in the small lift region with increased accuracy and control the rotation position of the control shaft 12.

The amount of air taken into the internal combustion engine can be controlled by adjusting the lift amount and operating angle of the intake valve 40. In this instance, the sensitivity of the intake air amount to a change in the lift amount and operating angle increases with a decrease in the lift amount and operating angle. As described earlier, the system according to the present embodiment is suitable for achieving adequate control accuracy for the control shaft 12 in the small lift region. Therefore, the system according to the present embodiment can accurately control the lift amount of the intake valve 40 in the small lift region. As a result, the intake air amount can be accurately controlled by the intake valve 40 in all operating regions.

In the process described above, the motor actuator 20 is driven at a low speed to bring the worm wheel 14 into contact with the low-end stopper 60. The low-speed drive method is used to rotate the motor actuator 20 at a predetermined speed that is lower than a rotation speed for normal operating conditions. The use of such a low-speed drive mode sufficiently reduces the impact applied to the worm wheel 14 and low-end stopper 60 when the worm wheel 14 comes into contact with the low-end stopper 60. The use of the low-speed drive mode also sufficiently reduces the damage to the worm wheel 14, low-end stopper 60, and worm gear 18 during the time interval between the instant at which the worm wheel 14 comes into contact with the low-end stopper 60 and the instant at which such contact is detected. Therefore, the system according to the present embodiment makes it possible to learn the reference output without causing a decrease in durability or accelerating deterioration with time.

In the first embodiment, which has been described above, the low-end stopper 60 and high-end stopper 62 are both furnished. However, the present invention is not limited to the use of both the low-end stopper 60 and high-end stopper 62. An alternative is to furnish only one side with a stopper.

When the reference output is to be learned in the first embodiment described above, the worm wheel 14 comes into contact with the low-end stopper 60 in the slow-speed drive mode. However, the above conditions are not always essential to reference output learning. In other words, it is preferred that the low-speed drive mode be used to bring the worm wheel 14 into contact with the low-end stopper 60. Alternatively, the reference output may be learned after the worm wheel 14 comes into contact with the high-end stopper 62 in a normal drive mode.

In the first embodiment, which has been described above, the variable valve mechanism 10 is capable of changing the operating angle and lift amount of the intake valve 40. However, it is not always necessary that the variable valve mechanism have such a function. Further, the valve body to be driven by the variable valve mechanism is not limited to the intake valve. More specifically, the valve body to be driven by the variable valve mechanism may be an exhaust valve. Moreover, the variable valve mechanism may alternatively be capable of changing the operating angle or lift amount of the valve body.

The major features and benefits of the present invention described above are summarized as follows:

A variable valve system according to the first aspect of the present invention includes a variable valve mechanism for changing the operating angle and/or lift amount of a valve body in accordance with the rotation position of a control shaft. A rotary drive mechanism for rotating the control shaft is provided. A drive mechanism control unit for controlling the rotary drive mechanism is also provided so that the rotation position of the control shaft changes within a normal rotation range during a normal operation. A stopper is further provided for mechanically restricting the rotation of the control shaft outside the normal rotation range.

The second aspect of the present invention may include a rotation angle sensor for changing an output in accordance with the rotation position of the control shaft. A learning time drive mechanism control unit may be provided for driving the rotary drive mechanism under predefined conditions until the rotation of the control shaft is restricted by the stopper. A restricted output detection unit may be also provided for detecting the output of the rotation angle sensor while the rotation of the control shaft is restricted by the stopper. A reference output learning unit may be further provided for learning the reference output of the rotation angle sensor in accordance with the output detected by the restricted output detection unit.

In the third aspect of the present invention, the learning time drive mechanism control unit may rotate the rotary drive mechanism at a speed lower than during a normal operation within a region where the rotation position of the control shaft is outside the normal rotation range.

In the fourth aspect of the present invention, the variable valve mechanism may simultaneously increase or decrease the operating angle and lift amount of the valve body. The stopper may include a low-end stopper for mechanically restricting the rotation of the control shaft on a side on which the operating angle and lift amount are minimized. The learning time drive mechanism control unit may drive the rotary drive mechanism under the predefined conditions until the rotation of the control shaft is restricted by the low-end stopper.

In the first aspect of the present invention, the stopper for mechanically restricting the rotation of the control shaft is installed outside the normal rotation range of the control shaft. Therefore, the present invention effectively prevents the control shaft from colliding against the stopper during a normal operation.

When predefined conditions are established, the second aspect of the present invention causes the stopper to restrict the rotation of the control shaft and detects the output of the rotation angle sensor in the resulting state. Consequently, it is possible to obtain an output that corresponds to an assured rotation position. The present invention learns the reference output of the rotation angle sensor on the basis of the sensor output obtained in the above manner, thereby making it possible to properly learn the rotation angle sensor reference output.

While the rotation position of the control shaft is outside the normal rotation range, the third aspect of the present invention can decrease the rotation speed of the control shaft. Therefore, it is possible to sufficiently reduce the impact that is generated when the stopper restricts the rotation position of the control shaft.

When the reference output of the rotation angle sensor is to be learned, the fourth aspect of the present invention permits the low-end stopper to restrict the rotation of the control shaft. When this learning method is used, high sensor accuracy can be attained in a region where the lift is small. The smaller the lift amount is, the higher the sensitivity of the amount of gas circulation upon valve body opening becomes to the lift amount. It is therefore required that the valve body lift amount be accurately controlled within a region where the lift amount is small. The present invention satisfies such requirements because it can raise the sensor accuracy in a region where the lift amount is small.

In the first embodiment, which has been described above, the motor actuator 20, worm gear 18, and worm wheel 14 correspond to the "rotary drive mechanism" according to the first aspect of the present invention. The low-end stopper 60 and high-end stopper 62 correspond to the "stopper" according to the first aspect of the present invention. The "drive mechanism control unit" according to the first aspect of the present invention is implemented when the ECU 30 controls the rotation position of the control shaft 12 between the minimum lift position and maximum lift position under normal operating conditions.

In the first embodiment, which has been described above, the "learning time drive mechanism control unit" according to the second aspect of the present invention is implemented when the ECU 40 performs processing steps 100 through 110. The "restricted output detection unit" according to the second aspect of the present invention is implemented when the ECU 40 performs processing step 112. The "reference output learning unit" according to the second aspect of the present invention is implemented when the ECU 40 performs processing step 114.

Further, the present invention is not limited to these embodiments, but variations and modifications may be made without departing from the scope of the present invention.

The invention claimed is:

1. A variable valve system, comprising:
    a variable valve mechanism for changing the operating angle and/or lift amount of a valve body in accordance with the rotation position of a control shaft;
    a rotary drive mechanism for rotating said control shaft;
    drive mechanism control means for controlling said rotary drive mechanism so that the rotation position of said control shaft changes within a normal rotation range during a normal operation;
    a stopper for mechanically restricting the rotation of said control shaft outside said normal rotation range;
    a rotation angle sensor for changing an output in accordance with the rotation position of said control shaft;
    learning time drive mechanism control means for driving said rotary drive mechanism under predefined conditions until the rotation of said control shaft is restricted by said stopper;
    restricted output detection means for detecting the output of said rotation angle sensor while the rotation of said control shaft is restricted by said stopper; and
    reference output learning means for learning the reference output of said rotation angle sensor in accordance with the output detected by said restricted output detection means.

2. The variable valve system according to claim 1, wherein said learning time drive mechanism control means rotates said rotary drive mechanism at a speed lower than during a normal operation within a region where the rotation position of said control shaft is outside said normal rotation range.

3. The variable valve system according to claim 1, wherein said variable valve mechanism simultaneously increases/decreases the operating angle and lift amount of the valve body; wherein said stopper includes a low-end stopper for mechanically restricting the rotation of said control shaft on a side on which said operating angle and lift amount are minimized; and wherein said learning time drive mechanism control means drives said rotary drive mechanism under said predefined conditions until the rotation of said control shaft is restricted by said low-end stopper.

4. A variable valve system, comprising:
    a variable valve mechanism for changing the operating angle and/or lift amount of a valve body in accordance with the rotation position of a control shaft;
    a rotary drive mechanism for rotating said control shaft;
    drive mechanism control unit for controlling said rotary drive mechanism so that the rotation position of said control shaft changes within a normal rotation range during a normal operation;
    a stopper for mechanically restricting the rotation of said control shaft outside said normal rotation range;
    a rotation angle sensor for changing an output in accordance with the rotation position of said control shaft;
    learning time drive mechanism control unit for driving said rotaly drive mechanism under predefined conditions until the rotation of said control shaft is restricted by said stopper;

restricted output detection unit for detecting the output of said rotation angle sensor while the rotation of said control shaft is restricted by said stopper; and reference output learning unit for learning the reference output of said rotation angle sensor in accordance with the output detected by said restricted output detection unit.

5. The variable valve system according to claim 4, wherein said learning time drive mechanism control unit rotates said rotary drive mechanism at a speed lower than during a normal operation within a region where the rotation position of said control shaft is outside said normal rotation range.

6. The variable valve system according to claim 4, wherein said variable valve mechanism simultaneously increases/decreases the operating angle and lift amount of the valve body; wherein said stopper includes a low-end stopper for mechanically restricting the rotation of said control shaft on a side on which said operating angle and lift amount are minimized; and wherein said learning time drive mechanism control unit drives said rotary drive mechanism under said predefined conditions until the rotation of said control shaft is restricted by said low-end stopper.

\* \* \* \* \*